United States Patent [19]
Child et al.

[11] 3,927,998
[45] Dec. 23, 1975

[54] PRODUCTION OF METHANE-RICH GAS STREAM

[75] Inventors: Edward T. Child, Tarrytown, N.Y.; Allen M. Robin, Anaheim, Calif.; William L. Slater, La Habra, Calif.; George N. Richter, San Marino, Calif.

[73] Assignee: Texaco Inc., New York, N.Y.

[22] Filed: Dec. 28, 1973

[21] Appl. No.: 429,468

[52] U.S. Cl.................. 48/197 R; 48/215; 252/373; 260/449 M
[51] Int. Cl.² .......................................... C10J 3/06
[58] Field of Search........... 48/215, 197 R; 252/373; 260/449 M

[56] References Cited
UNITED STATES PATENTS

| | | | |
|---|---|---|---|
| 2,963,348 | 12/1960 | Sellers | 48/197 R |
| 3,444,099 | 5/1969 | Taylor et al. | 48/197 R |
| 3,709,669 | 1/1973 | Marion et al. | 48/215 |
| 3,740,204 | 6/1973 | Slater et al. | 48/215 |
| 3,816,332 | 6/1974 | Marion | 48/215 |

*Primary Examiner*—S. Leon Bashore
*Assistant Examiner*—George C. Yeung
*Attorney, Agent, or Firm*—T. H. Whaley; C. G. Ries; Albert Brent

[57] ABSTRACT

Improved process for the production of a methane-rich product gas stream comprising the following steps: partial oxidation of a hydrocarbonaceous fuel feed employing a $H_2O$/fuel weight ratio of 2.2 to 2.9 and an atomic ratio of oxygen in the substantially pure oxygen to carbon in the fuel of 0.80 to 0.84 to produce a process gas stream comprising principally $H_2$, CO and $CH_4$ in which the mole ratio $H_2/CO$ is 1 to 2.5, the mole % $CH_4$ is 15 or more, and the particulate carbon is 13 weight % (basis carbon in the fuel) or less; cooling the process gas stream and separating $H_2O$, $CO_2$, carbon, and gaseous impurities; reacting together the $H_2$ and CO in said process gas stream in a catalytic methanation zone to produce a methane-rich gas stream principally comprising $CH_4$ and containing gaseous members selected from the group consisting of $H_2$, CO, $H_2O$, $CO_2$, and mixtures thereof; and removing said $H_2O$ and $CO_2$ to produce a methane-rich product gas stream comprising about 93 mole percent of $CH_4$. By means of the subject invention there is produced a high heating value clean fuel gas or a substitute natural gas of about 960 BTU per SCF or more.

11 Claims, No Drawings

PRODUCTION OF METHANE-RICH GAS STREAM

BACKGROUND OF THE INVENTION

1. Field of the Invention

This invention relates to a continuous process for the production of a methane-rich gas stream. More specifically, the present invention relates to the production of clean burning gaseous heating fuels that may be burned without polluting the environment from low cost hydrocarbonaceous materials.

2. Description of the Prior Art

A natural dilemma exists as the result of a diminishing supply of natural gas and an increasing demand for it. The impact of the gas crisis is being felt nationwide in rising prices, in governmental regulations with respect to the consumption of natural gas, and in prohibitions against the use of natural gas in future commercial, industrial and apartment-house construction. It is imperative that alternate sources of lowcost gaseous heating fuels be developed.

In coassigned U.S. Pat. No. 3,688,438, synthesis gas was made having up to 26 volume percent of methane by the partial oxidation of a hydrocarbonaceous fuel using comparatively high steam to fuel weight ratios and no subsequent catalytic methanation step. In coassigned U.S. Pat. No. 3,709,669 the synthesis gas leaving the partial oxidation gas generator is subjected to an additional step involving the water-gas shift reaction to adjust the $H_2/CO$ mole ratio to preferably 3 before catalytic methanation.

In comparison with the prior art, in the subject invention critical amounts of steam and oxygen are used in the partial oxidation step. A process gas stream is thereby produced having a critical and comparatively low $H_2/CO$ ratio i.e. 1 to 2.5 while unexpectedly having a high methane content i.e. 15 mole % or more. Unexpectedly, when this process gas stream was subjected to catalytic methanation, a product gas stream was produced having a methane content of at least 93 mole % after $H_2O$, $CO_2$, and $H_2S$ are removed. Economic benefits of the subject invention include the elimination of the troublesome water-gas shift reaction considered essential by prior art processes to adjust the $H_2/CO$ ratio of the feed gas stream to the methanator; and also the substantial reduction in the amount of steam and oxygen ordinarily consumed.

SUMMARY

It was unexpectedly found that a noncatalytic freeflow synthesis gas generator may be operated within a narrow range so that the synthesis gas produced by the partial oxidation of a hydrocarbonaceous fuel has a mole ratio $H_2/CO$ in the range of 1 to 2.5, a mole % $CH_4$ of at least 15, and a maximum particulate carbon content of 13 wt. % (basis carbon in the feed). The unobvious critical relationship of the feedstreams to the generator to produce said synthesis gas is as follows: a weight ratio of $H_2O$/hydrocarbonaceous fuel in the range of 2.2 to 2.9 and the atomic ratio of oxygen in the free-oxygen containing gas to carbon in the fuel in the range of 0.80 to 0.84.

After cooling, cleaning, and removing acid-gases and $H_2O$ from the effluent gas stream from the generator, the process gas stream may be subjected to catalytic methanation. Unexpectedly, it was found that the product gas from the catalytic methanator contained a maximum amount of methane when the mole ratio $H_2/CO$ of the feed gas to the methanator was in the range of 1 to 2.5. As previously noted in the first step of the subject process, the effluent gas from the synthesis gas generator contained this critical ratio. By the subject process, a product gas stream may be produced comprising 93 mole % $CH_4$ after $H_2O$ and $CO_2$ are removed. The gas may be burned as a fuel without polluting the atmosphere.

One economic advantage of the subject process is the elimination of the water-gas shift reaction that priorart processes require to adjust the $H_2/CO$ mole ratio of the feed gas to the methanator.

DESCRIPTION OF THE INVENTION

The present invention relates to a continuous process for producing a methane-rich gas stream i.e. at least 93 mole % $CH_4$ or more (dry basis).

In the first step of the process, synthesis gas comprising mixtures of principally hydrogen, carbon monoxide, carbon dioxide, water vapor and methane and one or more members of the group consisting of nitrogen, argon, carbonyl sulfide and hydrogen sulfide, and entrained particulate carbon is produced by the reaction of a hydrocarbonaceous fuel by partial oxidation with substantially pure oxygen and $H_2O$ in the reaction zone of a free-flow synthesis gas generator free from packing or catalyst. The composition of the charge and the conditions of the reaction are controlled so as to produce an effluent gas stream containing a critical mole ratio $H_2/CO$ in the range of 1 to 2.5, at least 15 mole % of methane, and from about 0.1 to 13 wt. % of entrained particulate carbon (basis weight of carbon in the hydrocarbonaceous fuel).

Hydrocarbonaceous fuels which are suitable feedstocks for the process include by definition various petroleum distillate and residua, naphtha, gas oil, asphalt residual fuel, reduced crude, whole crude, coal tar, coal oil, shale oil, and tar sand oil. Included also are pumpable slurries of solid hydrocarbonaceous fuels e.g. coal, particulate carbon, and petroleum coke in a liquid hydrocarbon fuel such as previously listed, or water.

$H_2O$ is supplied to the generator as a gaseous phase. It may be introduced either separately or in admixture with the substantially pure oxygen or with the hydrocarbonaceous feedstock, or both. Water will moderate the temperature of the reaction zone and may also react with CO and the hydrocarbon fuel in the reaction zone. It was unexpectedly found that in the operation of the synthesis gas generator for producing synthesis gas by the partial oxidation of the hydrocarbonaceous fuel, a specific relationship existed between the weight ratio $H_2O$/hydrocarbonaceous fuel and the atomic ratio O/C for the free-oxygen containing gas in order to produce a product gas having a mole ratio $H_2/CO$ in the range of 1 to 2.5. Further, it was unexpectedly found that this mole ratio $H_2/CO$ of 1–2.5 in the feed gas to the catalytic methanator was critical with respect to producing a maximum yield of $CH_4$. The aforesaid weight ratio of $H_2O$ to hydrocarbonaceous fuel in the feed to the generator in the subject invention was found to be in the narrow range of 2.2 to 2.9 when the atomic ratio oxygen in the substantially pure oxygen to carbon in the hydrocarbonaceous fuel was in the narrow range of 0.80 to 0.84.

Substantially pure oxygen (99 mole % $O_2$ or more) is introduced into the reaction zone of the synthesis gas generator simultaneously with the $H_2O$ and hydrocarbonaceous fuel. Suitably, an annulus-type burner, such as described in coassigned U.S. Pat. No. 2,928,460 issued to du Bois Eastman et al., or in coassigned U.S. Pat. No. 3,743,606 issued to C. P. Marion et al., may be employed. The substantially pure oxygen may be introduced at a temperature in the range of about ambient to 1000°F. The amount of oxygen supplied is controlled so as to prevent complete oxidation of the hydrocarbonaceous feed and to control the temperature in the reaction zone.

The reaction zone is preferably a conventional Texaco Synthesis Gas Generator. The synthesis-gas generator is free from any obstructions to the flow of the gases therethrough. The gas generator is a cylindrically shaped vertical steel pressure vessel whose inside walls are lined with refractory. An axially aligned flanged inlet port is located at the top of the vessel, and a flanged outlet port is located at the bottom. The various feedstreams may be introduced into the gas generator at ambient temperature, but preferably they are introduced at a temperature in the range of about 100°F to 1000°F. Preferably, an annulus-type burner which is axially mounted in the top flanged port of the generator may be used for introducing and mixing the feedstreams.

Suitable gas generators are disclosed in U.S. Pat. Nos. 2,818,326 and 3,000,711 to du Bois Eastman et al. The size of the reaction chamber is selected so that the average residence time of the reactants and resulting reaction products within the reactor is within the range of 0.5 to 20 seconds, and preferably 1 to 8 seconds.

In the reaction zone of the free-flow noncatalytic synthesis gas generator, reaction takes place at an autogenous temperature in the range of about 1700° to 3100°F. and preferably in the range of about 1800° to 2200°F, and at a pressure in the range of about 1 to 250 atmospheres, and preferably in the range of about 20 to 200 atmospheres.

The effluent gas stream from the gas generator has the following dry gas composition in mole %: $H_2$ 27 to 41; CO 12 to 30; $CO_2$ 21 to 34; $CH_4$ 15 to 22; $H_2S$ nil to 2.0; COS nil to 0.1; $N_2$ nil to 0.3; Ar nil to 0.3; and from 0.1 to 13 wt. % of particulate carbon (basis C in hydrocarbonaceous fuel).

By conventional means, the effluent gas stream from the generator is cooled, and the particulate carbon, $H_2O$, $CO_2$, and gaseous impurities are removed. Thus, the effluent gas stream may be passed through an in-line waste heat boiler and cooled to a temperature in the range of about 400° to 800°F. by indirect heat exchange with water, thereby producing steam. The steam may be used elsewhere in the process, such as in the gas generator. Alternately, the effluent gas stream from the gas generator may be quenched in water in a quench tank such as shown in coassigned U.S. Pat. No. 2,896,927. Advantageously, by this means a large portion of the particulate carbon and other solids entrained in the effluent gas stream is removed by the quench water.

Further, particulate carbon and any other entrained solids may be removed from the effluent gas stream by well known scrubbing techniques in a gas-liquid scrubbing zone. For example, the particulate carbon may be removed by scrubbing the process gas with a scrubbing fluid comprising oil, water, or both. The slurry of particulate carbon and oil scrubbing fluid may be recycled to the gas generator as a portion of the feedstock.

When oil is used as the scrubbing fluid, preferably the temperature of the scrubbing oil is kept below its cracking temperature and above the dewpoint of $H_2O$ in the process gas stream. In one embodiment of our process, the process gas stream is introduced into a liquid-gas tray-type column, such as more fully described in Perry's Chemical Engineers' Handbook, Fourth Edition, McGraw Hill 1963, Pages 18-3 to 5 in countercurrent flow with a liquid hydrocarbon fuel oil. A slurry of particulate carbon and liquid hydrocarbon fuel oil is removed from the bottom of the scrubbing column at a suitable preheat temperature for introducing into the reaction zone of the synthesis gas generator as a portion of the hydrocarbonaceous feedstock.

When required, additional scrubbing may be provided to supplement the aforesaid gas scrubbing. For example, the gas stream may be quenched in hydrocarbon oil or washed with a liquid hydrocarbon fuel by means of a scrubbing nozzle or venturi scrubber, such as described in Perry's Chemical Engineers' Handbook Fourth Edition, MCGraw-Hill 1963, Pages 18-54 to 56. The process gas stream leaving from the top of the scrubbing tower substantially free from particulate carbon and at a temperature in the range of about 400°-650°F. is then cooled to condense out and separate any volatilized hydrocarbons and water found therein. For additional information on suitable gas scrubbing, reference is made to conassigned U.S. Pat. No. 3,639,261.

$CO_2$, $H_2O$, $H_2S$ and COS may be removed from the process gas stream in an acid-gas separation zone by a suitable conventional process involving cooling and physical or chemical absorption with solvents, such as n-methyl pyrrolidone, triethanolamine, propylene carbonate, or alternately with hot potassium carbonate. Methane should be substantially insoluble in the solvent selected. Most of the $CO_2$ absorbed in the solvent can be released by simple flashing. The stream of $CO_2$ has a purity of more than 98.5 percent and may therefore be used for organic synthesis. The regenerated solvent is then recycled to the absorption column for reuse. When necessary final cleanup may be accomplished by passing the process gas through iron oxide, zinc oxide, or activated carbon to remove residual traces of $H_2S$ or organic sulfide.

Similarly $H_2S$ and COS-containing solvent is regenerated by further flashing. The $H_2S$ and COS may be then converted into sulfur by a suitable process. For example, the Claus process may be used to produce elemental sulfur from $H_2S$, as described in Kirk-othmer Encyclopedia of Chemical Technology, Second Edition Volume 19, John Wiley, 1969, Page 352.

The substantially dry gaseous mixture from the acid-gas separation zone having the following composition in mole percent is then introduced into a methanation zone: $H_2$ 34 to 62, CO 15 to 38, $CH_4$ 19 to 34, $CO_2$ O, and O to less than about 0.1 parts per million of total sulfur i.e. $H_2S$ + COS.

The catalytic production of methane from carbon monoxide and carbon dioxide is highly exothermic. Unless the heat is successfully removed from the catalyst bed, high feed-gas throughputs can produce excessive catalyst-bed temperatures that can destroy the activity of the catalyst and reduce methane yields. Temperature control may be effected by any of the following techniques: distribution of the feed-gas stream throughout fixed bed reactors by means of separate inlet points, embedding tubular coolers in the catalyst beds and producing steam which may be used elsewhere in the process, cooling the effluent gas between beds with simultaneous steam generation, or by using a free-flow tubular reactor whose inside surfaces are coated with catalyst.

Another method of controlling catalyst-bed temperatures while increasing the concentration of methane in the product gas consists of recycling a portion of the product gases through the catalyst bed at ratios ranging from 1–50 volumes of recycle gas per volume of fresh feed gas and preferably at recycle ratios in the range of 1 to 5.

The Group VIII transition elements, mainly iron, nickel, and cobalt, appear to be the most suitable for us as methanation catalysts. Typical commercial preparations contain about 33 to 78 weight percent of nickel oxide and about 12 to 25 percent of aluminum oxide and are used in the form of ⅜ inch × ⅜ inch or ¼ inch × 174 inch cylindrical tablets. A typical nickel oxide catalyst is Girdler G65 produced by Chemetron Corp. Suitable catalyst compositions include the following: $NiO-Al_2O_3$ or $NiO-MgO$ precipitated on kaolin and reduced with hydrogen; and also in parts by weight Ni 100, $ThO_2$ 6, MgO 12, and Kieselguhr (diatomaceous earth) 400 reduced with hydrogen for 2 hours at 752°F. followed by heating at 932°F. The life of the catalyst may be extended by maintaining the sulfur level in the reactant gases below about 0.005 grains of sulfur per thousand standard cubic feet. The operating temperature in the methanator is in the range of about 390° to 1400°F. and suitably in the range of about 400° to 700°F. Space velocities range from 100 to 10,000 standard volumes of gas per volume of catalyst ($hr^{-1}$) and pressures range from 1 to 250 atmospheres. Preferably, the pressure in the methanator is substantially the same as that in the gas generator less any relatively minor ordinary drop in the line.

The effluent gas from the methanation catalytic reactor comprises from about 70 to 90 volume percent of methane or higher (dry basis), in admixture with $H_2O$, $CO_2$ and minor amounts of one or more members of the group $H_2$, CO, $N_2$ and Ar. The water in the effluent gas stream may be condensed out and any $CO_2$ is removed in the manner described previously, leaving substantially pure methane (93 volume percent minimum). If required, cryogenic refrigeration may be used to separate the methane from nitrogen and argon which may be present in amounts of 0 to 1.0 volume percent.

It was unexpectedly found that in the methanation reation, the greatest amount of methane in the $CO_2$ and $H_2O$ free product was produced, i.e., 93 mole % minimum, when the mole ratio $H_2/CO$ of the feed gas stream to the methanator was in the range of 1 to 2.5. This is quite unexpected since commercial methanation processes specify a $H_2/CO$ mole ratio of 3, or more.

In another embodiment of the invention for use with sulfur-containing hydrocarbonaceous fuels containing 1 to 7 wt. % sulfur such as liquid hydrocarbon fuel oils or high sulfur coal or mixtures thereof, a unique sulfur resistant methanation catalyst comprising in wt. % CoO 3.2, $MoO_3$ 15.7, and $Al_2O_3$ 81.1 such as described in co-assigned U.S. application Ser. No. 429,470, filled simultaneously herewith, is used as the catalyst in the methanation step. In this second embodiment, the effluent gas stream from the generator is cooled to a temperature in the range of about 400° to 800°F. by direct or indirect heat exchange as previously described, particulate carbon and $H_2O$ are removed, and the process gas stream is introduced into the catalytic methanator. After methanation, at a temperature in the range of about 500° to 1500°F. and suitably 500° to 800°F. and at a pressure of 1 to 250 atmospheres, all of the $H_2O$, $CO_2$, $H_2S$ and COS are removed from the process gas stream by conventional methods. A product gas stream is thereby produced comprising at least 93 mole % $CH_4$ and one or more members of the group $N_2$, Ar, $H_2$ and CO.

By the subject invention, a clean fuel gas may be produced. This process has the following significant advantages over other schemes for making fuel gas:

1. Steam to the generator will be reduced by about 50%.
2. Oxygen requirements will be reduced since the generator will operate at a lower O/C ratio.
3. Substantial reduction in generator and waste heat boiler size since the large steam volume will have been reduced by around 50 percent.
4. The shift converter (either thermal or catalytic) proposed in some other schemes can be eliminated since the 3·1 $H_2$:CO ratio is no longer required as feed to the methanator.
5. The amount of steam that has to be condensed after the waste heat boiler will be reduced by about 50%.
6. A maximum yield of desirable products i.e. $CH_4+H_2+CO$ are obtained at the same generator temperature and soot production.
7. Lower $CO_2$ production will reduce the load on the acid gas removal section and may even permit the direct handling of the $H_2S/CO_2$ stream in a Claus unit rather than having to separate the $H_2S$ and the $CO_2$.
8. With sulfur resistant catalysts, it is not necessary to remove the acid gases, at least not completely, before the methanator. Thus, if a gas purification step is required, it may be performed once only after the methanation step.

EXAMPLES

The following examples are offered as a better understanding of the present invention but the invention is not to be construed as unnecessarily limited thereof.

EXAMPLE 1

Run No. 1 — On an hourly basis about 198 pounds of California vacuum residuum feedstock at a temperature of 285°F. are introduced into a free-flow non-catalytic synthesis gas generator by way of annulus-type burner. The oil feedstock has an API gravity of 9.0, a viscosity of 5000 Saybolt Seconds Furol at 122°F., and a heat of combustion of 18200 BTU (British Thermal Units) per pound. The oil feedstock has the following ultimate analysis in weight %: C 86.3, H 10.4, O 0.0, N 1.0, S 2.3, and ash 0.04.

Simultaneously, 580 pounds of steam at a temperature of 625°F. and 2,270 SCFH (Standard Cubic Feet per Hour) of substantially pure oxygen (99.5% $O_2$) at a temperature of 55°F. are charged into the gas generator. The weight ratio $H_2O$/fuel is 2.9 and the atomic ratio of $O_2$ in the substantially pure oxygen to carbon in the fuel is 0.84.

Reaction takes place between the feedstreams in the reaction zone at a pressure of about 45 atmospheres and at an autogeneous temperature of 1960°F. The average residence time in the 2 cubic ft. reaction zone is about 4 seconds. By the partial oxidation reaction, the hydrocarbonaceous feedstream is converted into 7297 SCFH of an effluent gas stream having the following dry gas composition in mole percent: CO 16.6, $H_2$ 34.1, $CO_2$ 31.2, $CH_4$ 17.5 $N_2$+AR 0.2, $H_2S$ 0.4, and COS 0.02. In addition, 12.8 pounds per hour of particulate carbon is entrained in the effluent gas stream from the gas generator.

The process gas stream leaving the gas generator is cooled to a temperature of 600°F. by indirect heat exchange with water in a waste heat boiler. Simultaneously, steam for recycle to the gas generator is produced in the waste heat boiler. In a manner previously described, the particulate carbon is scrubbed from the process gas stream, and water and the acid gases e.g. $CO_2$, $H_2S$, COS are removed. A stream of dry synthesis gas substantially comprising $H_2$, CO and $CH_4$ is produced. The mole ratio of $H_2$ to CO is 2.06.

At a space velocity of 7000 standard volumes of gas per volume of catalyst per hour and at 500°F. the aforesaid stream of dry synthesis gas is introduced into a catalytic methanation reactor. The methanation catalyst comprises in parts by weight Ni 100, $ThO_2$ 6, MgO 12 and Kieselguhr 400. $H_2$ and CO are reacted together in the methanation zone at a pressure of about 44 atmospheres. The methane-rich gas stream leaving the methanator at a temperature of 620°F., has the following dry gas composition in mole %: $CH_4$ 84.6 $H_2$ 3.0, CO 0.004, $N_2$+AR 0.6, and $CO_2$ 11.8.

By methods previously described, $H_2O$ and $CO_2$ may be removed from the process gas stream to produce a stream of fuel gas or synthetic natural gas having a heat of combustion of 980 BTU/SCF and the following composition in mole %: $CH_4$ 95.9, $N_2$+Ar 0.6 and $H_2$ 3.4.

EXAMPLE II

Run numbers 2–5 are conducted in substantially the same manner as described previously for Run No. 1, except with respect to the feed to the generator. The weight ratio $H_2O$/fuel is varied over a range of 2.2 to 2.9, and the atomic ratio O/C is varied over a range of 0.80 to 0.84. The results for Runs 1–5 are summarized in Table I and show that when the generator feed comprises comparatively low $H_2O$/fuel weight ratios the effluent gas from the generator comprises more than 15 mole % $CH_4$, less than 13 weight percent of particulate carbon (basis weight of carbon in the fuel), and a $H_2$/CO mole ratio of less than 2.5.

TABLE I

EXAMPLE II
Operation of Gas Generator

| Feed to Generator | Run No. 1 | 2 | 3 | 4 | 5 |
|---|---|---|---|---|---|
| $H_2O$/fuel, lb/lb | 2.2 | 2.5 | 2.5 | 2.9 | 2.9 |
| O/C, atomic ratio | .80 | .80 | .84 | .80 | .84 |
| Effluent Gas From Generator | | | | | |
| $CH_4$, mole % | 15.4 | 17.4 | 15.2 | 20.7 | 17.6 |
| $H_2$/CO, mole ratio | 1.7 | 1.9 | 1.9 | 2.1 | 2.1 |
| C, wt% (basis C in fuel) | 11.7 | 12.1 | 7.8 | 12.8 | 5.1 |

Obviously many modifications and variations of the invention as hereinbefore set forth may be made without departing from the spirit and scope thereof, and only such limitations should be imposed as are indicated in the appended claims.

We claim:

1. A process for producing a methanerich gas stream comprising the steps of
   1. reacting a hydrocarbonaceous fuel feed by partial oxidation with substantially pure oxygen comprising 99 mole % $O_2$ or more and $H_2O$ at an autogeneous temperature in the range of about 1700° to 3100°F and a pressure in the range of about 1 to 250 atmospheres in the reaction zone of a free-flow unpacked noncatalytic synthesis gas generator, wherein the weight ratio of $H_2O$/hydrocarbonaceous fuel is in the range of 2.2–2.9 and the atomic ratio of oxygen in the substantially pure oxygen to carbon in the fuel is in the range of 0.80–0.84, and the stream of effluent gas leaving said synthesis gas generator principally comprises mixtures of $H_2$ and CO having a mole ratio $H_2$/CO in the range of 1.0 to 2.5, $CH_4$ in the amount of 15 mole % or more, $H_2O$, $CO_2$, and one or more members of the groups COS, $H_2S$, Ar and $N_2$, and wherein said effluent gas stream contains 13 weight % or less of particulate carbon (basis weight of C in said hydrocarbonaceous fuel feed);
   2. cooling the process gas stream from (1) and separating particulate carbon, $H_2O$, $CO_2$ and one or more members of the group COS, $H_2S$, Ar, and $N_2$; and
   3. introducing the dry process gas stream from (2) without a separate water-gas shift step into a catalytic methanation zone where said $H_2$ and CO are reacted together at a temperature in the range of about 390° to 1400°F. and at a pressure in the range of about 1 to 250 atmospheres to produce a methane-rich gas stream principally comprising $CH_4$ and containing $H_2O$, $CO_2$, and one or more members of the group $H_2$, CO, Ar and $N_2$; and
   4. Separating said $H_2O$ and $CO_2$ from the methane-rich gas stream from (3) to produce a product gas stream comprising at least 93 mole % $CH_4$.

2. The process of claim 1 provided with the additional steps of separating from the methane-rich gas stream of step (4) one or more members of the group $H_2$, CO, Ar, and $N_2$.

3. The process of claim 1 wherein the pressure in said synthesis gas generator is in the range of about 20 to 200 atmospheres.

4. The process of claim 1 wherein at least a portion of the hydrocarbonaceous fuel feed in step (1) comprises a pumpable slurry of a solid hydrocarbonaceous fuel selected from the group consisting of the particulate carbon separated in step (2), coal, and petroleum coke in admixture with a light selected from the group consisting of liquid hydrocarbon fuel or water.

5. The process of claim 1 wherein said hydrocarbonaceous fuel feed in step (1) is a liquid hydrocarbon selected from the group consisting of petroleum distillate, naphtha, gas oil, residual fuel, reduced crude, asphalt, whole crude, coal tar, coal oil, shale oil, and tar sand oil, and mixtures thereof.

6. A process for producing a methane-rich gas stream from a sulfur-containing hydrocarbonaceous fuel comprising the steps of
   1. reacting said hydrocarbonaceous fuel feed by partial oxidation with substantially pure oxygen comprising 99 mole % $O_2$ or more and $H_2O$ at an autogenous temperature in the range of about 1700° to 3100°F. and a pressure in the range of about 1 to 250 atmospheres in the reaction zone of a free-flow unpacked noncatlytic synthesis gas generator, wherein the weight ratio of $H_2O$/hydrocarbonaceous fuel is in the range of 2.2–2.9 and the atomic ratio of oxygen in the substantially pure oxygen to carbon in the fuel is in the range of 0.80–0.84 and the stream of effluent gas leaving the synthesis gas generator principally comprises $H_2$ and CO having a mole ratio $H_2$/CO in the range of 1.0 to 2.5, $CH_4$ in the amount of 15 mole % or more, $H_2O$, $CO_2$, and one or more members of the group $H_2S$, COS, $N_2$, and Ar, and 13 wt. % or less of particulate carbon (basis weight of C in said hydrocarbonaceous fuel feed);

2. cooling the process gas stream from (1) to a temperature in the range of about 400° to 800°F. by indirect heat exchange with water thereby producing steam;

3. separating particulate carbon and $H_2O$ from the process gas stream from (2);

4. introducing the dry process gas stream from (3) without a separate water-gas shift step into a methanation zone containing a sulfur-resistant methanation catalyst where said $H_2$ and CO are reacted together at a temperature in the range of about 500° to 1500°F. and at a pressure in the range of about 1 to 250 atmospheres to produce a methanerich gas stream principally comprising mixtures of $CH_4$, $H_2O$, and $CO_2$ and one or more members of the group COS, $H_2S$, Ar, $N_2$, $H_2$, and CO; and 5. separating said $H_2O$, $CO_2$, $H_2S$, and COS from the methane-rich gas stream of step (4).

7. The process of claim 6 provided with the step of separating from the process gas stream from step (5) one or more members of the group Ar, $N_2$, $H_2$, and CO.

8. The process of claim 6 wherein said hydrocarbonaceous fuel contains from about 1 to 7 wt. % sulfur and is selected from the group consisting of liquid hydrocarbon fuel, coal, and mixtures thereof.

9. The process of claim 6 wherein the catalyst in step (4) comprises in wt. % CoO 3.2, $MoO_3$ 15.7 and $Al_2O_3$ 81.1.

10. The process of claim 6 wherein the pressure in each of the steps is the pressure in the gas generator in step (1) less ordinary drop in the lines.

11. The process of claim 6 wherein the temperature in the methanation zone is in the range of about 500° to 800°F.

* * * * *